US008454054B1

(12) United States Patent
Raines (10) Patent No.: US 8,454,054 B1
(45) Date of Patent: Jun. 4, 2013

(54) ACTIVE BOLSTER WITH VENTED HERMETIC SEAL

(75) Inventor: Stacey H. Raines, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/608,176

(22) Filed: Sep. 10, 2012

(51) Int. Cl.
*B60R 21/04* (2006.01)

(52) U.S. Cl.
USPC .... 280/753; 280/730.1; 280/748; 296/187.05

(58) Field of Classification Search
USPC ............... 280/728.1, 748, 750–753, 730.1, 280/730.2; 296/187.05, 187.06, 187.12
IPC .................. B60R 21/04,21/21, 21/045, 21/055
See application file for complete search history.

(56) References Cited

U.S. PATENT DOCUMENTS

| 4,805,930 | A | 2/1989 | Takada |
| 5,310,215 | A | 5/1994 | Wallner |
| 5,704,639 | A | 1/1998 | Cundill et al. |
| 5,725,244 | A | 3/1998 | Cundill |
| 6,017,057 | A | 1/2000 | O'Docherty |
| 6,032,978 | A | 3/2000 | Spencer et al. |
| 6,203,057 | B1 | 3/2001 | Spencer et al. |
| 6,213,497 | B1 | 4/2001 | Spencer et al. |
| 6,758,493 | B2 | 7/2004 | Conlee et al. |
| 7,413,219 | B2 | 8/2008 | Sarmiento et al. |
| 7,469,926 | B2 | 12/2008 | Lewis et al. |
| 8,328,230 | B1* | 12/2012 | Kalisz .................... 280/730.1 |
| 8,336,910 | B1* | 12/2012 | Kalisz et al. ............ 280/730.1 |
| 2008/0164681 | A1 | 7/2008 | Nuthalapati |
| 2009/0152848 | A1 | 6/2009 | Sadr et al. |
| 2009/0152849 | A1 | 6/2009 | Saraf et al. |
| 2009/0284041 | A1 | 11/2009 | Hall et al. |
| 2010/0207370 | A1 | 8/2010 | Haba et al. |
| 2010/0326782 | A1 | 12/2010 | VandenBerge et al. |
| 2011/0115201 | A1* | 5/2011 | Best et al. ................. 280/728.2 |

(Continued)

FOREIGN PATENT DOCUMENTS

| EP | 1314615 B1 | 11/2006 |
| WO | WO200711787 A1 | 10/2007 |

OTHER PUBLICATIONS

Raj S. Roychoudhury et al., Blow-Molded Plastic Active Knee Bolsters, SAE Technical Paper Series 2004-01-0844, Mar. 8-11, 2004, pp. 1-9.

(Continued)

*Primary Examiner* — Ruth Ilan
(74) *Attorney, Agent, or Firm* — Vichit Chea; MacMillan, Sobanski & Todd, LLC (57) ABSTRACT

An active bolster has a plastic-molded, expandable inner wall and a plastic-molded outer wall overlying the inner wall are joined around a closed perimeter region to form an inflatable bladder. One wall surface includes a plurality of upstanding, concentric ribs within the closed perimeter region for providing attachment between the inner and outer walls which is preserved during inflation of the inflatable bladder. The concentric ribs include an innermost rib and an outermost rib. Each concentric rib has a respective window, wherein the windows are respectively offset to provide a to serpentine path through the concentric ribs from the central volume to atmosphere outside the outermost rib. At least one of the windows is closed by a breakaway seal configured to prevent flow of the inflation gas through the serpentine path until it ruptures at a predetermined pressure during inflation of the inflatable bladder.

11 Claims, 6 Drawing Sheets

U.S. PATENT DOCUMENTS

| | | | |
|---|---|---|---|
| 2011/0316300 A1* | 12/2011 | Kalisz | 296/37.12 |
| 2012/0248741 A1* | 10/2012 | Kalisz | 280/728.2 |
| 2012/0267878 A1* | 10/2012 | Kalisz et al. | 280/728.2 |
| 2013/0015647 A1* | 1/2013 | Kalisz | 280/743.2 |

OTHER PUBLICATIONS

Bijoy K. Saraf, et al., Active Bolster for Side Impact Protection, SAE Technical Paper Series 2008-01-0191, Apr. 14-17, 2008, pp. 1-11.

* cited by examiner

ACTIVE BOLSTER WITH VENTED HERMETIC SEAL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an active bolster with an inflatable bladder formed by a circumferential hermetic seal between two plastic panels that is constructed to provide improved load management and increased robustness of the seal.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. Pending U.S. application Ser. No. 13/089,401, filed Apr. 19, 2011, also incorporated herein by reference, discloses a typical structure wherein an active bolster includes a front wall or panel that faces a vehicle occupant attached to a base wall or panel along a sealed periphery. One or both of the walls is deformable in order to provide an inflatable bladder. For example, the base wall may have a pleated (i.e., accordion-like) region that straightens out during inflation. The walls are initially spaced apart by a small amount when in their pre-deployment, non-inflated condition. This allows ingress of the inflation gas in a manner that achieves even inflation across the panel.

The front and base walls of a typical active bolster are comprised of molded thermoplastics such as polyethylene, polyolefin, or PVC. They are typically injection molded but could also be blow molded. When formed separately, the front and base walls must be hermetically joined around their periphery in order to form the inflatable bladder. The joint must be strong to resist separation as a result of the high pressures during inflation.

From a manufacturing standpoint, welding (such as hot plate, ultrasonic, friction, or laser welding) is a desirable method for attaching the front and base walls. In order to provide welding surfaces, one or more raised circumferential ribs or ramparts on one wall may be used to extend into contact with a matching surface on the other wall in a heated condition to form the weld. The weld must withstand large shear forces during inflation, and a failure of the weld could result in complete loss of the ability to absorb an impact. In order to achieve a fast rate of inflation so that the bolster is ready to receive an impact in a very short amount of time, high capacity/high pressure gas inflators must be used—which increases the forces that must be handled by the peripheral weld.

In order to optimize the dissipation of energy when an occupant contacts an inflated bolster during a crash event, inflation gas may be vented to achieve a properly controlled deceleration of the impacting body. Moreover, in the case of an active bolster employing a bladder formed by molded plastic panels, it is desirable to vent the pre-inflation bladder at all times to maintain it at substantially atmospheric pressure during non-crash conditions. Otherwise, noticeable deformation of the interior trim component incorporating the active bolster may occur during temperature extremes since the panel materials are relatively flexible. As a result of the presence of the vents when bladder inflation is initiated during a crash event, a larger inflator is required. The higher pressure of the inflator increases the stress applied to the peripheral seal. In any particular bladder design, the stress applied to the seal may be uneven around the periphery. Care must be taken to ensure that the weld is configured to withstand all the applied stresses.

Fixed vent holes formed in at least one of the plastic panels that provide a constant venting capacity have been used. In addition, active vents with a variable venting capacity have also been introduced to accommodate different venting needs during different stages of inflation and impact, as disclosed in copending U.S. application Ser. No. 13/076,737, filed Mar. 31, 2011, entitled "Active Bolster With Active Venting," which is incorporated herein by reference. For example, a lower venting capacity is desired during initial stages of inflation to obtain adequate expansion before being impacted by the occupant. Then during cushioning (such as when the occupant's legs or knees impact an active knee bolster), a higher venting capacity may be provided to allow the bladder to better dissipate the force of impact. It is desirable to integrate an active venting mechanism in a manner that avoids added components or costs while enabling precise control over the amount of change in the venting capacity and the timing of the changes.

SUMMARY OF THE INVENTION

The present invention employs a hermetic seal structure that integrates a variable venting function that improves load management while reducing the likelihood of failure of the welded seal. A controlled breakage of the hermetic seal may coincide with a region that otherwise experiences the highest stresses during inflation, thereby lowering the strength required of the weld in that location. The active vent may be incorporated into the peripheral seal without any added components or cost.

In one aspect of the invention, an active bolster for mounting at an interior trim surface of an automotive vehicle comprises a plastic-molded, expandable inner wall and a plastic-molded outer wall overlying the inner wall. The inner wall has a first surface facing the outer wall and the outer wall has a second surface facing the inner wall. The inner wall and outer wall are joined around a closed perimeter region to form an inflatable bladder with an open central volume between the first and second surfaces. An inflator couples an inflation gas into the central volume to inflate the active bolster in response to a crash event of the vehicle. One of the first or second surfaces includes a plurality of concentric ribs upstanding from the one surface within the closed perimeter region for providing attachment between the inner and outer walls which is preserved during inflation of the inflatable bladder. The concentric ribs include an innermost rib and an outermost rib. Each concentric rib has a respective window, wherein the windows are respectively offset to provide a serpentine path through the concentric ribs from the central volume to atmosphere outside the outermost rib. At least one of the windows is closed by a breakaway seal configured to prevent flow of the inflation gas through the serpentine path until it ruptures at a predetermined pressure during inflation of the inflatable bladder.

DETAILED DESCRIPTION OF PREFERRED EMBODIMENTS

Figure 1:
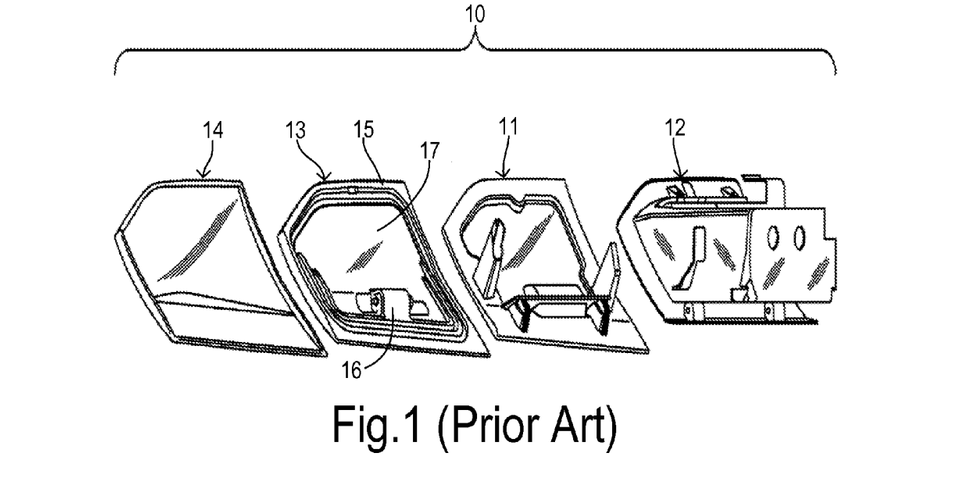
FIG. 1 is an outward-looking, exploded perspective view of an active knee bolster glove box door system of a type to which the present invention can be applied.

Referring now to FIG. 1, a prior art active knee bolster system 10 has a base panel component 11 which forms the foundation for the bolster. Base 11 may be either attached to the vehicle by hinging from a storage cavity or glove box 12 as shown in FIG. 1, or mounted to another structure such as an instrument panel support below a steering column, for example. Such locations are accessible to the knees of an individual riding in a corresponding seating position within a vehicle.

Base 11 acts as a reaction surface for supporting an inflatable bladder formed by an inner wall 13 and an outer wall 14 that are joined around their periphery 15. Walls 13 and 14 are preferably comprised of molded plastics (such as TPO) and are joined by plastic welding, such as hot plate welding, to form a peripheral seal around a central region 17 for forming a bladder. An inflation gas source 16 is electronically controlled for activating during a crash to release gas to inflate the bolster. Outer wall 14 may comprise the interior trim surface (e.g., the outside of the glove box door), or an additional skin or cover (not shown) can be applied to its outer surface (i.e., Class A surface).

Figure 2:
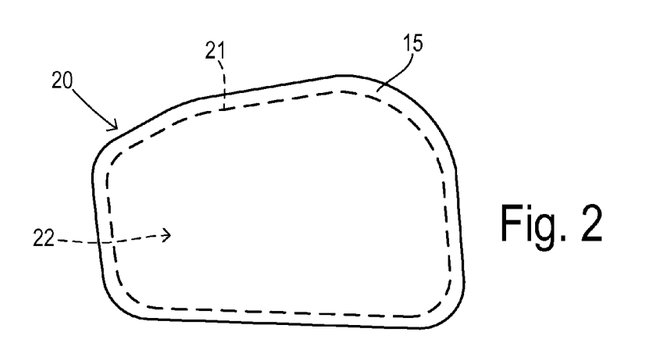
FIG. 2 is a plan view of an inner and outer wall assembly showing the location of a closed perimeter weld forming an internal bladder.

FIG. 2 is a plan view of a bladder assembly 20 of an inner panel and an outer panel. Around its periphery 15, an internal weld 21 is formed between the panels resulting in an internal inflatable bladder section 22. When inflator 16 releases gas into bladder 22, the expanding gas causes expansion of bladder 22 resulting in sheer stress being applied to weld 21. Weld failure results in loss of the seal and degraded performance of the bolster.

Figure 3:
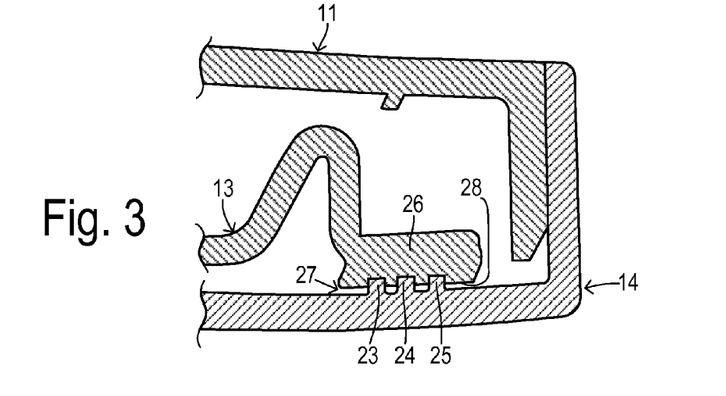
FIG. 3 is a cross section of a weld with concentric ribs.

With hot plate welding, welding ribs have been employed as shown in FIG. 3. Thus, outer wall 14 includes concentric ribs 23, 24, and 25 which are hot welded to an outer edge 26 of inner wall 13. Ribs 23-25 preferably penetrate into and fuse with edge 26 as a result of the hot welding. However, penetration is only partial so that there is a gap 27 between edge 26 and the main rearward-facing surface 28 of outer wall 14.

Figure 4:
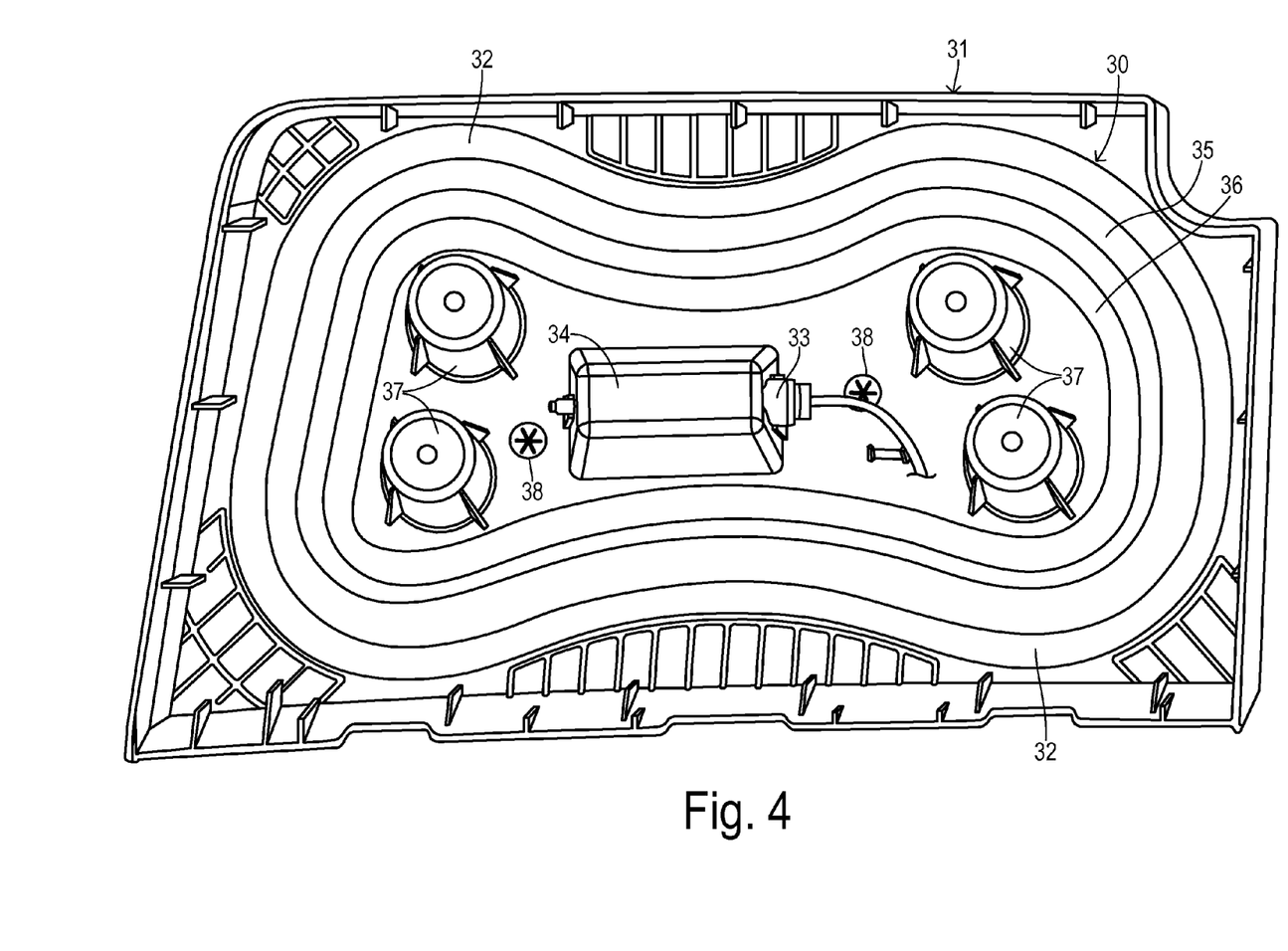
FIG. 4 is a rear perspective view of an active bolster with the inner or base wall welded to the outer or finishing wall.

FIG. 4 is a rear view of an inflatable bladder in one preferred embodiment of the invention. A plastic-molded outer wall 31 overlies a plastic-molded, expandable inner wall 30. Walls 30 and 31 are joined around a closed perimeter region 32 to form an inflatable bladder having an open central volume between walls 30 and 31 to receive an inflation gas from an inflator 33 mounted in a recess 34 of inner wall 30 during a crash event. Inner wall 30 includes a plurality of pleats, such as 35 and 36, to accommodate the expansion of inner wall 30 during inflation. A plurality of bosses 37 are used to mount inner wall 30 to a reaction surface. Vent holes 38 comprised of an asterisk-shaped pattern cut through inner wall 30 may be included for venting the central volume prior to and during inflation.

Figure 5:
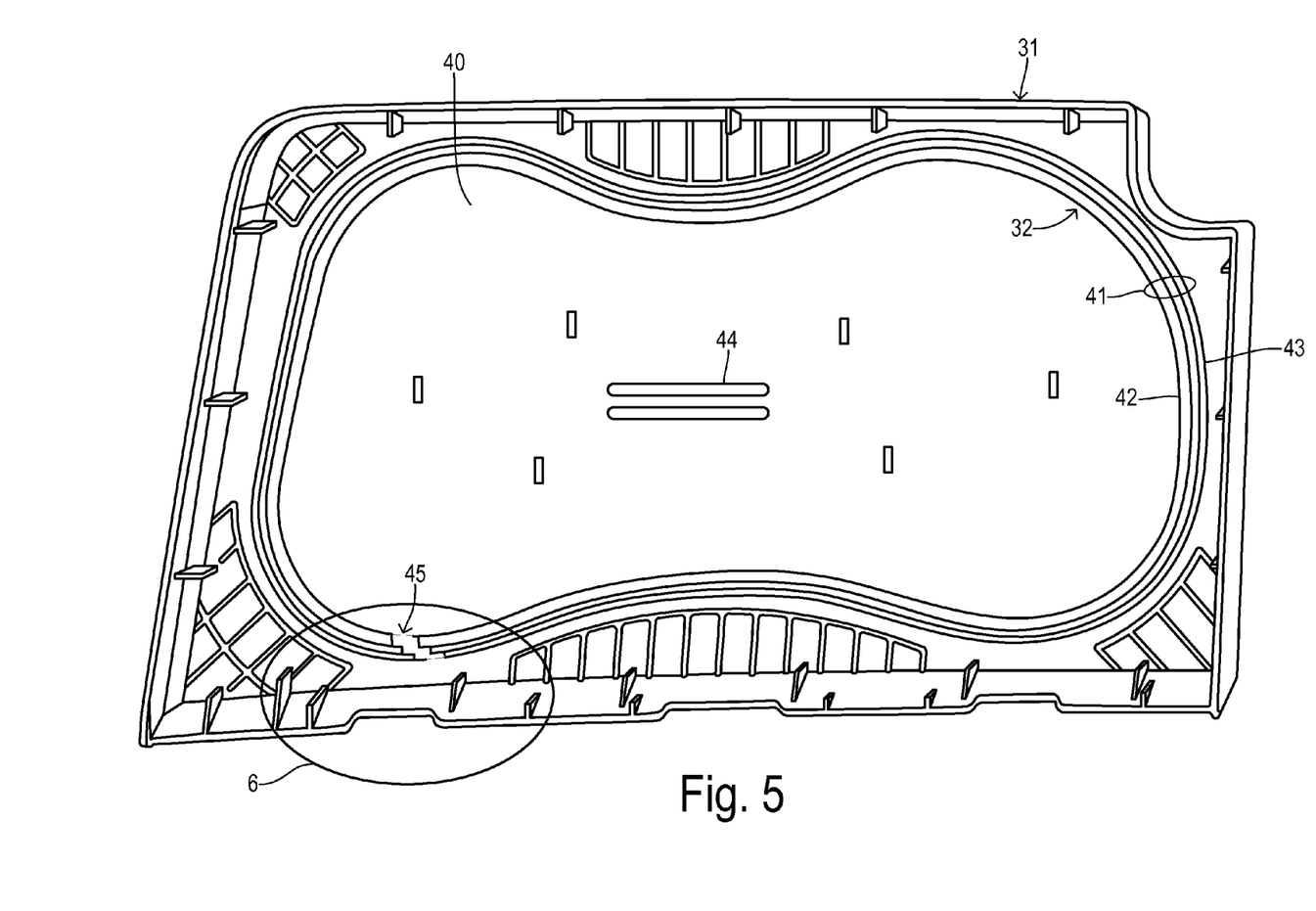
FIG. 5 is a rear perspective view of the outer wall with the inner wall removed to reveal the location of a vent passage through the weld.

FIG. 5 shows outer wall 31 with the inner wall removed. Outer wall 31 has a surface 40 facing a matching surface of the inner wall (e.g., surface 28 in FIG. 3). Closed perimeter region 32 includes a plurality of concentric ribs 41 upstanding from surface 40 to provide for the attachment between outer wall 31 and the inner wall via a hermetic seal formed by hot welding. Outer wall 31 may include other upstanding ribs such as ribs 44 for supporting inflator 33. Regardless of the number of circumferential ribs employed, there is an innermost rib 42 and an outermost rib 43. Concentric ribs 41 include an active vent passage 45 progressing from innermost rib 42 through outermost rib 43 and all intervening ribs to supplement the vent capacity during later stages of inflation.

Figure 6:
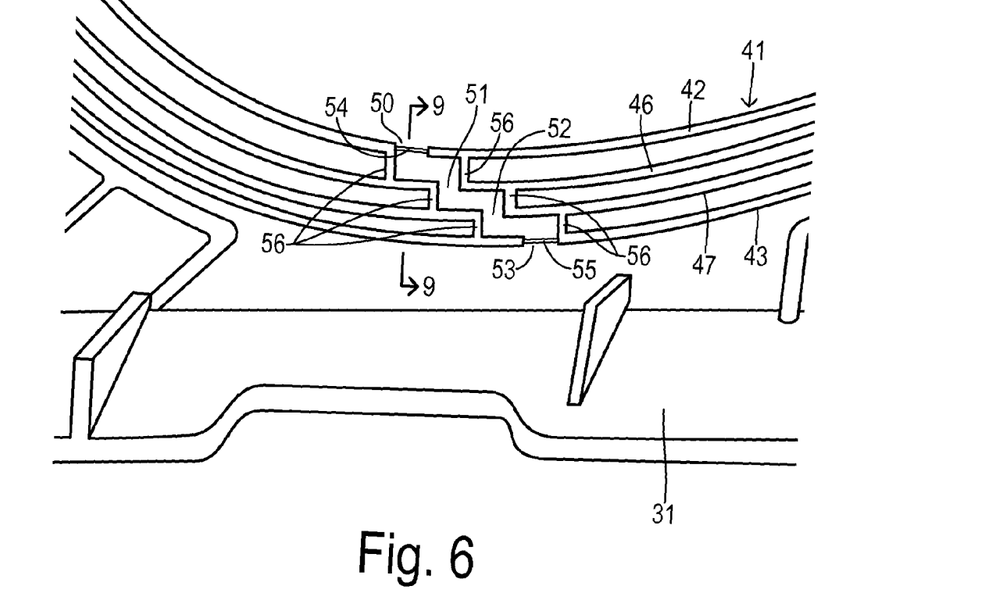
FIG. 6 is a plan view showing the vent passage in greater detail.

Referring to FIG. 6, concentric ribs 41 include inner most rib 42, outer most rib 43, and intermediate ribs 46 and 47. Each rib has a respective window or aperture interrupting the circumference of each rib. In particular, rib 41 has a window 50, rib 46 has a window 51, rib 47 has a window 52, and rib 43 has a window 53. Windows 50-53 are respectively offset to provide a serpentine path through ribs 41 from the central inflation volume to the atmosphere (i.e., passenger compartment) outside outermost rib 43. The offset insures that the windows are not radially aligned which could result in too much weakening of the peripheral seal at one location. The size (e.g., cross section) of the flow passage through windows 50-53 results in a flow rate of inflation gas in response to an impacting occupant against the bladder that produces a predetermined cushioning (i.e., the dissipation of energy to provide the desired deceleration of the occupant).

At least one window is closed by a breakaway seal configured to prevent flow of inflation gas through the serpentine path until the breakaway seal ruptures at a predetermined pressure during inflation of the inflatable bladder. Thus, a breakaway seal 54 closes window 51 and a breakaway seal 55 closes window 53. Breakaway seals 54 and 55 may preferably be comprised of an integrally-molded partition spanning each respective window that is thinner than the ribs themselves. The thickness and contact area of breakaway seals 54 and 55 determine the pressure at which they rupture, which allows a designer to balance the need for rapid inflation with the need for reduced loading upon the body impacting the bolster.

In order for the venting gasses to be contained within the serpentine path, a plurality of bridging ribs 56 may be provided between pairs of adjacent concentric ribs. This prevents the venting gases from affecting other regions of the peripheral weld.

Figure 7:
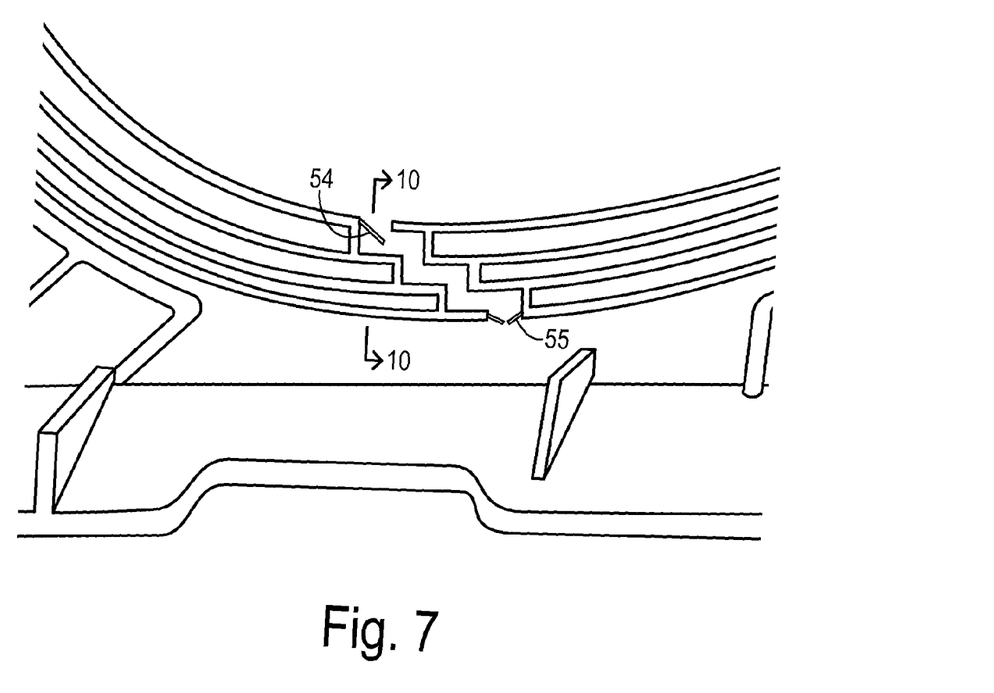
FIG. 7 is a plan view showing the vent passage after rupturing of the windows in response to bladder inflation.

FIG. 7 illustrates the rupturing of breakaway seals 54 and 55. The rupturing occurs in the portions of the concentric ribs and breakaway seals that do not penetrate the inner wall during the hot welding process.

Figure 8:
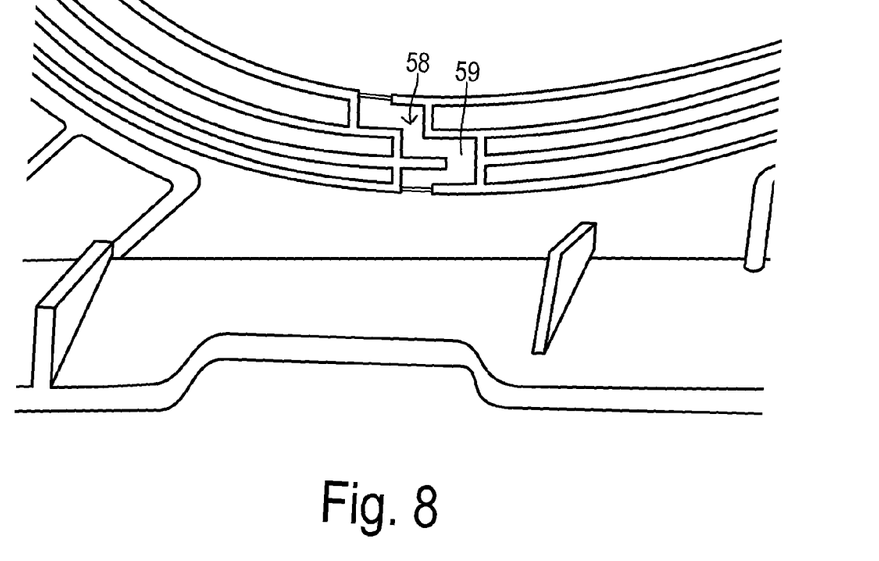
FIG. 8 is a plan view of an alternative embodiment of a vent passage.

FIG. 8 illustrates a serpentine path 58 having a course reversal at 59. However, offsetting the successive windows in the same direction may be more advantageous for maintaining the integrity of the peripheral seal. It will be apparent to one skilled in the art that various path layouts and window placements, as well as various placements of breakaway seals in different ones of the windows, are possible.

Figure 9:
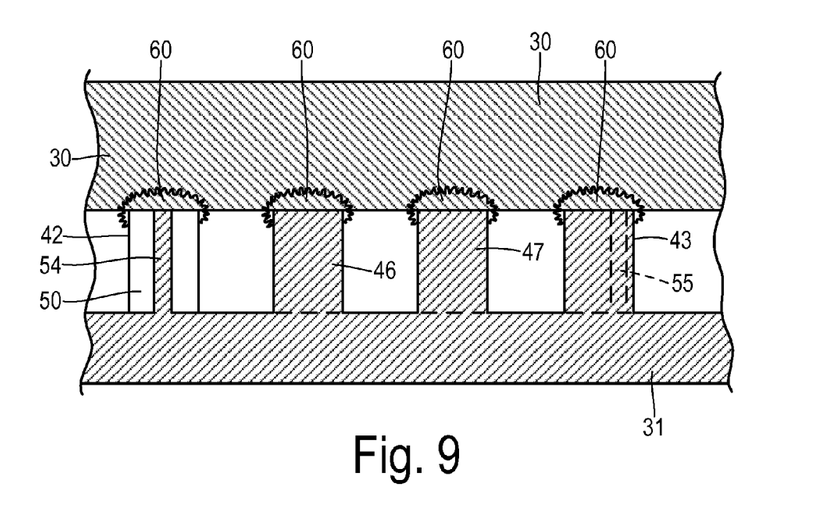
FIG. 9 is a cross section of a hermetic seal showing the concentric ribs and window prior to rupturing.
Figure 10:
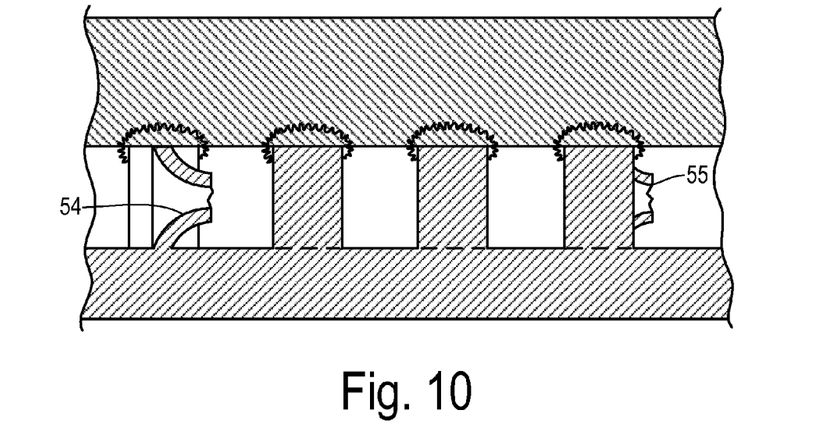
FIG. 10 is a cross section of a hermetic seal showing the concentric ribs and window after rupturing.

Referring to FIG. 9, weld regions 60 are shown between concentric ribs 42, 43, 46, and 47 and inner wall 30. Before the predetermined pressure is reached during inflation, window 50 in innermost rib 42 is closed by breakaway seal 54, while breakaway seal 55 closes the respective window in outermost rib 43. FIG. 10 illustrates ruptured breakaway seals 54 and 55 as a result of a predetermined pressure occurring in the inflatable bladder. Thus, the present invention supplements prior art vents that may be molded into the bladder walls. A stepped pathway through the hermetic weld seal allows gas to escape by means of a controlled breakage of the seal that helps prevent any other uncontrolled breakage. The supplemental vents can be placed anywhere on the periphery to alleviate hoop stress of the weld seal at any desired location, such as the weakest point, for example. Furthermore, the invention allows gas to escape more quickly once an outside load such as an impacting body is applied to the bolster.

What is claimed is:

1. An active bolster for mounting at an interior trim surface of an automotive vehicle, comprising:
    a plastic-molded, expandable inner wall;
    a plastic-molded outer wall overlying the inner wall, wherein the inner wall has a first surface facing the outer wall and the outer wall has a second surface facing the inner wall, and wherein the inner wall and outer wall are joined around a closed perimeter region to form an inflatable bladder with an open central volume between the first and second surfaces; and
    an inflator for coupling an inflation gas into the central volume to inflate the active bolster in response to a crash event of the vehicle;
    wherein one of the first or second surfaces includes a plurality of concentric ribs upstanding from the one surface within the closed perimeter region for providing attachment between the inner and outer walls which is preserved during inflation of the inflatable bladder, wherein the concentric ribs include an innermost rib and an outermost rib;
    wherein each concentric rib has a respective window, wherein the windows are respectively offset to provide a serpentine path through the concentric ribs from the central volume to atmosphere outside the outermost rib, and wherein at least one of the windows is closed by a breakaway seal configured to prevent flow of the inflation gas through the serpentine path until it ruptures at a predetermined pressure during inflation of the inflatable bladder.

2. The active bolster of claim 1 wherein the breakaway seal is comprised of an integrally-molded wall that spans the respective window and that is thinner than the concentric ribs.

3. The active bolster of claim 1 wherein the windows in the innermost rib and the outermost rib each has a respective breakaway seal.

4. The active bolster of claim 1 wherein, after rupturing of the breakaway seals, the serpentine path provides a flow rate of the inflation gas configured to provide a predetermined cushioning of impacts against the active bolster during the crash event.

5. The active bolster of claim 4 wherein the inner wall includes a vent hole for venting inflation gas prior to rupturing of the breakaway seal.

6. The active bolster of claim 1 wherein the attachment of the concentric ribs to the other one of the first and second surfaces is comprised of a hot weld.

7. The active bolster of claim 1 wherein a plurality of windows are closed by respective breakaway seals, and wherein each breakaway seal is comprised of an integrally-molded wall that spans the respective window and that is thinner than the concentric ribs.

8. The active bolster of claim 1 wherein each pair of adjacent concentric ribs are joined by a respective bridging rib along an edge of one of the windows.

9. The active bolster of claim 1 wherein each pair of adjacent concentric ribs are joined by two respective bridging ribs along the sides of the serpentine path.

10. The active bolster of claim 1 wherein the concentric ribs are upstanding from the second surface of the outer wall.

11. An active bolster, comprising:
    an expandable inner wall and an outer wall joined along a hot welded perimeter having a plurality of concentric ribs each with a respective window;
    wherein the windows are respectively offset to provide a serpentine path across the ribs and at least one window is closed by a breakaway seal configured to prevent flow of an inflation gas until it ruptures at a predetermined pressure during inflation of the bolster.

* * * * *